Feb. 7, 1961 F. A. ABBATE 2,970,758

DEVICE FOR CALCULATING FIRE DEPARTMENT HYDRAULICS

Filed May 3, 1956

INVENTOR.
FRANK ANTHONY ABBATE
BY
Carl Miller
ATTORNEY

United States Patent Office 2,970,758
Patented Feb. 7, 1961

2,970,758

DEVICE FOR CALCULATING FIRE DEPARTMENT HYDRAULICS

Frank Anthony Abbate, Pleasantville, N.Y.
(407 Louis Ave., South Floral Park, N.Y.)

Filed May 3, 1956, Ser. No. 582,601
1 Claim. (Cl. 235—87)

This invention relates to computing devices and, more particularly, to apparatus for obtaining accurate hydraulic calculations.

Whenever hydraulic calculations are left to the "rule of thumb" method which is not uniform or standardized, there is a great variation in results depending upon the judgment of the particular individual. An object of this invention, therefore, is to provide accurate computing apparatus for calculating hydraulic data for various diameters of hose and nozzle pressures, which is efficient in operation, simplified in construction, and which will eliminate the aforementioned difficulties.

Another object of this invention is to provide calculating apparatus for determining pump pressure, hose resistance, and maximum effective vertical and horizontal reach, with respect to various nozzle pressures and hose diameters, to provide a uniform and fool-proof procedure for calculating this information.

All of the foregoing and still further objects and advantages of this invention will become apparent from a study of the following specification, taken in connection with the accompanying drawing, wherein.

Figures 1, 2, 3, 4, 5:
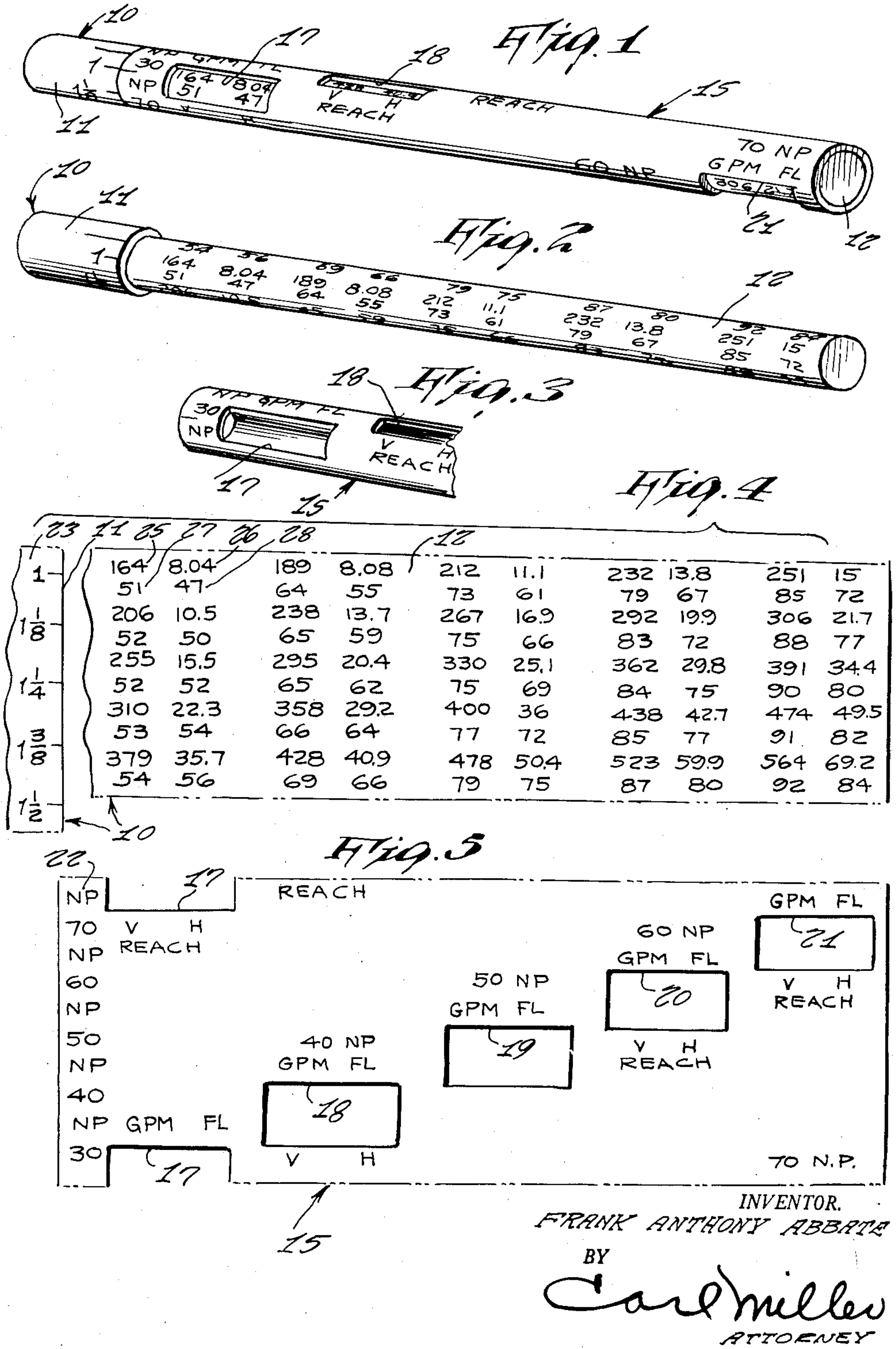
Figure 1 is a perspective view of a calculating device made in accordance with this invention.
Figure 2 is a view similar to Figure 1, showing one of the major components thereof.
Figure 3 is a view similar to Figure 1, showing another of the major components thereof with parts broken away.
Figure 4 is a lay-out view of the data contained on the component shown in Figure 2.
Figure 5 is a lay-out view showing the arrangement of various portions contained by the component shown in Figure 3.

Referring now to Figures 1 to 3 of the drawing, a calculating device made in accordance with this invention is shown to include a cylindrical drum 10 having a base 11 at one end and a reduced shaft portion 12 extending throughout the greater portion thereof. A cylindrical sleeve 15 of the same length as the reduced shaft portion 12, is adapted to be carried thereon and abut against the base 11 so as to form a cylinder of constant diameter.

As more clearly shown in Figure 5, the cylindrical sleeve 15 includes a series of spaced window openings 17, 18, 19, 20, and 21 that are arranged around the circumference thereof in a specific pattern. The scale 22 at the inner extremity of the sleeve provides an index for predetermined nozzle pressures between 30 and 70 pounds which pressures are adapted to be in alignment with the respective window openings spaced around the circumference of the sleeve. As shown in Figure 4, the inner edge of the base 11 of the cylindrical drum is provided with a scale 23 having numerically designated indexes in one-eighth intervals between 1 and 1½ to designate nozzle sizes thereby. The entire cylindrical shaft 12 is provided with series of numbers that are arranged in fours so as to be brought into view in the respective window openings of the sleeve. Each group of numbers contained thereon are adapted to provide information of various types. As viewed in Figure 4, the upper left number relates to gallons of flow per minute, the upper right number relates to the resistance of the hose against the flow of water per hundred feet of hose, the lower left number relates to the vertical reach of the stream, and the lower right number relates to the horizontal reach of the stream.

In operation, the assembled device as shown in Figure 1 is set so that the known nozzle pressure on the scale 22 of the sleeve is aligned with the known nozzle size on the scale 23 of the base 11. This is done merely by rotating the sleeve until the desired numbers are opposite each other. In Figure 1, a setting is shown for a nozzle pressure of thirty pounds in a hose of one inch diameter, whereupon by reading the figures in the window opening 17 associated with the thirty pound nozzle pressure scale, the desired data may be obtained; namely, that there will be 164 gallons of flow per minute, 8.04 pounds per square inch of resistance for every hundred feet of hose, the stream will have a vertical reach of 51 feet, and a horizontal reach of 47 feet. It will, therefore, be appreciated, that by setting the device for any combination of known nozzle pressures and hose sizes, the desired data may be readily obtained.

The construction of this device is such that it is compact, efficient in operation, and simple in construction. It is to be noted that the window openings are formed in predetermined spaced relationship circumferentially on the sleeve 15 and that the sleeve cooperates with the base 11 to form a smooth continuous surface that terminates at one end by the base 11 and the other end by the flush association of the shaft 12 with the terminal portion of the sleeve 15.

While this invention has been described with particular reference to the specific form shown in the drawing, it is to be understood that such is not to be construed as imparting limitations upon the invention, which is best defined by the claim appended hereto.

Having thus described my invention, I claim as new and desire to secure by Letters Patent:

A device for calculating fire department hydraulics, including the combination of an elongated cylindrical drum terminating at one end in a cylindrical base portion and having a shaft portion axially alined with the base portion and of lesser diameter than that of the latter, a cylindrical sleeve rotatably mounted upon the shaft portion and coextensive therewith and at one end abutting the base of said drum and being of substantially equal external diameter as that of the drum so as to present a single continuous cylindrical surface therewith, the base having a first index scale thereon while the mutually abutting portions of the sleeve together forming a second index scale and the shaft having a plurality of predetermined data groups thereon in predetermined arrangement, said sleeve defining a plurality of longitudinally and circumferentially spaced open windows for exposing selected ones of said data groups in response to each setting of the second index scale relative to the first index scale, the windows of the sleeve being corelated with said second index scale while said data groups on said shaft are corelated with said first index scale, said windows and data groups all being disposed in longitudinally spaced relationship respectively along said sleeve and said shaft and readable in the direction parallel to the longitudinal axis of the shaft, the end of said shaft remote from said cylindrical base portion terminating in a plane coinciding with that of the respectively adjacent end of the sleeve in order to determine the correct assembly of said sleeve with said shaft for accurate operative relationship.

References Cited in the file of this patent

UNITED STATES PATENTS

| | | |
|---|---|---|
| 613,432 | Szenhak | Nov. 1, 1898 |
| 1,486,313 | Van Antwerp | Mar. 11, 1924 |
| 1,507,996 | Goudelock | Sept. 9, 1924 |
| 2,307,967 | Stevenson | Jan. 12, 1943 |
| 2,558,457 | Pekar | June 26, 1951 |

FOREIGN PATENTS

| | | |
|---|---|---|
| 167,699 | Great Britain | Aug. 18, 1921 |